United States Patent [19]

Francisco et al.

[11] Patent Number: 5,759,603
[45] Date of Patent: Jun. 2, 1998

[54] PROCESS FOR PRODUCING A FOOD PRODUCT HAVING A DISTINCT PHASE

[75] Inventors: Neal Sylvester Francisco, Olivet; Chris Lynn Willoughby, Battle Creek, both of Mich.

[73] Assignee: Kellogg Company, Battle Creek, Mich.

[21] Appl. No.: 746,735

[22] Filed: Nov. 15, 1996

[51] Int. Cl.⁶ .................................................. A21D 16/00
[52] U.S. Cl. .......................... 426/249; 426/516; 426/448
[58] Field of Search ............................ 426/516, 249, 426/448; 425/131.1, 97, 113; 264/177.17; 366/336, 337, 338, 340, 341, 339

[56] References Cited

U.S. PATENT DOCUMENTS

| | | | |
|---|---|---|---|
| 2,646,757 | 7/1953 | Hackmann | 426/249 |
| 2,669,946 | 2/1954 | Peyton | 425/131.1 |
| 2,680,414 | 6/1954 | Balch | 425/131.1 |
| 2,774,314 | 12/1956 | Moser | 426/249 |
| 2,858,217 | 10/1958 | Benson | 425/131.1 |
| 3,286,992 | 11/1966 | Armeniades et al. | 366/339 |
| 3,635,444 | 1/1972 | Potter | 366/339 |
| 3,664,638 | 5/1972 | Grout et al. | 366/339 |
| 3,876,743 | 4/1975 | Soderlund et al. | 264/75 |
| 3,908,025 | 9/1975 | Miller et al. | 426/623 |
| 3,953,002 | 4/1976 | England, Jr. et al. | 366/339 |
| 4,029,823 | 6/1977 | Bone et al. | 426/249 |
| 4,358,468 | 11/1982 | Dolan et al. | 426/250 |
| 4,372,734 | 2/1983 | Dolan et al. | 426/512 |
| 4,408,893 | 10/1983 | Rice, III | 366/339 |
| 4,504,511 | 3/1985 | Binley | 426/249 |
| 4,524,081 | 6/1985 | Bansal | 426/249 |
| 4,542,686 | 9/1985 | Bansal | 99/483 |
| 4,698,228 | 10/1987 | Straka et al. | 426/446 |
| 4,784,870 | 11/1988 | Yokoyama et al. | 426/249 |
| 4,786,243 | 11/1988 | Kehoe | 425/131.1 |
| 4,840,493 | 6/1989 | Horner | 366/338 |
| 4,850,705 | 7/1989 | Horner | 366/338 |
| 4,940,593 | 7/1990 | Duffy | 426/94 |
| 4,965,085 | 10/1990 | Heyland et al. | 426/533 |
| 5,120,554 | 6/1992 | Farnsworth et al. | 426/282 |
| 5,122,322 | 6/1992 | Momose | 425/131.1 |
| 5,165,949 | 11/1992 | Farnsworth et al. | 426/496 |
| 5,174,653 | 12/1992 | Halat | 366/339 |
| 5,385,746 | 1/1995 | DeAlmeida | 426/447 |
| 5,538,748 | 7/1996 | Boatman et al. | 426/516 |

FOREIGN PATENT DOCUMENTS 9427801  12/1994  WIPO.

OTHER PUBLICATIONS

2 Product Sheets, TOGUM (date presently unknown).

Primary Examiner—Cynthia L. Nessler
Attorney, Agent, or Firm—Felfe & Lynch

[57] ABSTRACT

Disclosed is a food product having at least one distinct phase and a process and apparatus for producing such a product wherein a blend of ingredients, having a moisture content, is extruded in separate streams, and a coloring, flavoring or texturizing agent is added to the extruded streams at a pre-determined point. The streams are re-combined and then passed through a static mixer which produces minimal mixing while allowing a smooth separation and a proper flow into a die insert such as a shaping die.

24 Claims, 1 Drawing Sheet

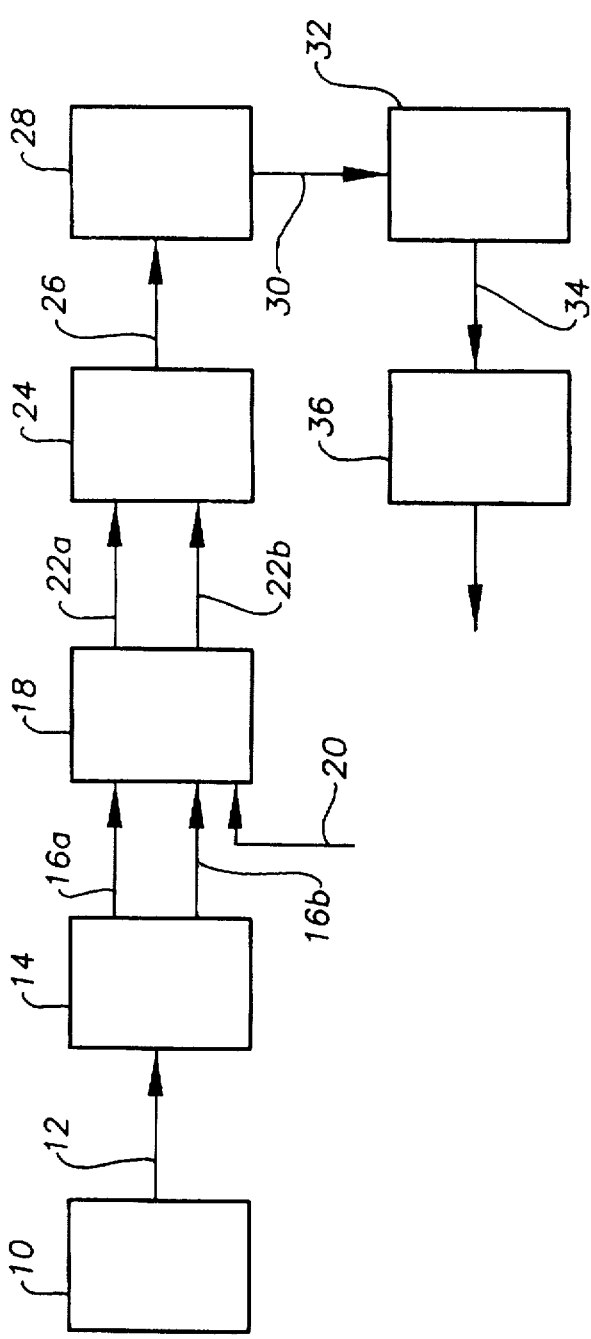
FIG. 1
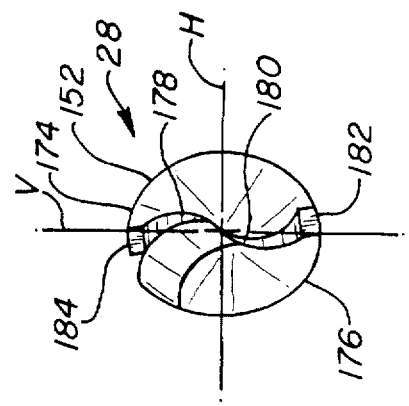
FIG. 4
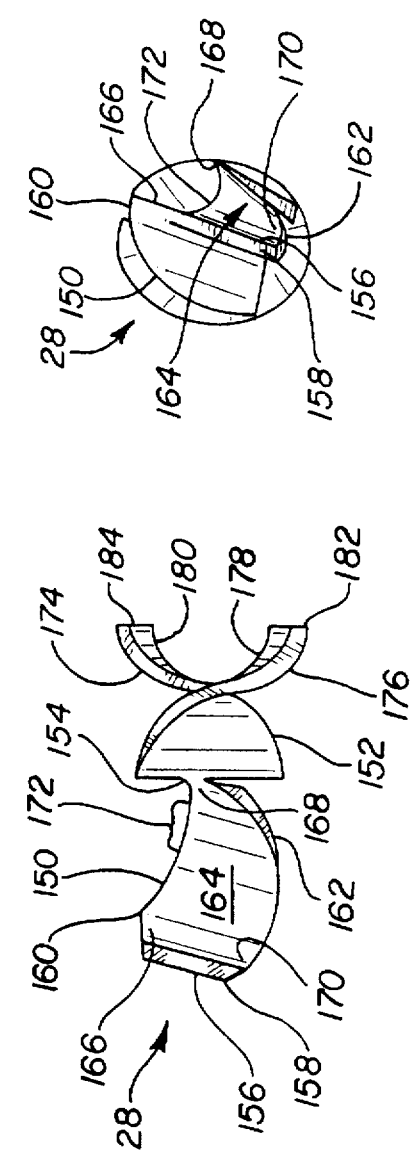
FIG. 3
FIG. 2

5,759,603

PROCESS FOR PRODUCING A FOOD PRODUCT HAVING A DISTINCT PHASE

BACKGROUND OF THE INVENTION

This invention relates to a food product having at least one distinct phase and a process and apparatus for producing such a product. A product has a distinct phase when a surface area or volume of the product extending from the product surface, or below the product surface, has a different characteristic than other surface areas or volumes of the same product. In the product of the invention, the food product has at least one varied characteristic such as coloring, flavoring, or texture or a combination of two or more varied characteristics.

Today's consumer is offered a large number of food products which have been prepared and/or treated in numerous ways for considerations such as convenience, storage stability, and organoleptic considerations, e.g., taste or feel during mastication, and appearance. Food producers are continuously seeking ways to differentiate their product from others by means of coloring, flavoring, and/or design.

It is highly desirable to produce a product having one or more varied characteristics, for example, a product having a variation in appearance, with such a varied characteristic being incorporated in the product at various locations as desired.

A method and apparatus having the flexibility to produce a product having a randomized distribution of two or more varied characteristics, such as colors, flavors, or textures would be highly desirable. This is especially true where the product is marketed as a multi-piece product. Such products include but are not limited to cereals, candies, and snack foods. However, it is also desirable to impart a variegated appearance to a product marketed as a mass or single product in a single package.

A limited number of products offering variations within a single package are known. However, such products are often difficult to produce because the production usually requires additional processing steps and careful control. Each process step or operation introduces a potential bottleneck in the process should the apparatus or control systems break down during operation. Each step also is a possible source of off-spec product should that part of the system fail to operate properly. Since it is of the utmost importance to food producers to maintain a constant quality of product including taste, smell, and appearance, it is highly desirable to eliminate, or minimize the possibilities for off-spec product.

While prior art processes generally involve processing two different streams, the disclosed processes generally give a homogenous end product.

U.S. Pat. Nos. 4,524,081 and 4,542,686 to Bansal each show a process and apparatus for producing a marbled pet food wherein a white component stream and a separate red component stream are extruded, combined, and forced through a static mixer and a die. The white pet food stream is advanced into a plurality of medial locations within the conduit wherein the red pet food stream is combined with the white pet food stream so as to form a single-merged pet food stream with the white pet food disposed within a red pet food at a plurality of medial locations so as to produce a stream wherein the white pet food stream appears as a series of small circular cores within the combined mass. The merged pet food stream is then partially mixed by at least one stationary mixing element which divides the mixed stream into two sub-streams and discharges them into a conduit as a reconsolidated partially mixed pet food stream. The final product has a marbelized appearance wherein the white and red components are interdispersed but not homogeneously mixed.

SUMMARY OF THE INVENTION

The present invention is in a food product having at least one distinct phase, i.e., at least one non-uniform characteristic or feature such as coloring and/or flavoring and/or texture.

In one embodiment of the invention, the product has a variegated appearance or pattern. In another aspect of the invention, the process produces a product having a distinct phase on a surface which may be a two dimensional or a three dimensional surface. In a further aspect of the invention, the varied characteristic extends beneath the product surface through at least a partial depth of the product cross-section. In another embodiment, the product is a multi-colored food product having a distinct swirled appearance, i.e., the colors are randomly distributed and arranged throughout, at the least, on the product surface.

In another aspect of the invention, the product has a distinct phase of a different texture or flavor. In yet another embodiment, the product has at least two distinct phases such a coloring and flavoring, coloring and texture, or flavoring and texture. In still another embodiment, the product has three distinct phases, e.g., coloring, flavoring, and texture.

In the process of the invention, at least two food streams are provided which can be the same or different but are preferably the same. The food streams may be formed by producing a hydrated mix, optionally pre-cooked, which is introduced into an extruder for blending and/or further cooking. The mix is substantially cooked within the extruder. The cooked material from the extruder is then divided into at least two streams. A coloring and/or flavoring and/or texturizing agent is injected into at least one of the cooked streams in mixing sections wherein the agent is mixed into the one or more streams. The separated streams are then recombined into a single stream in a re-mix section. The re-mixed or combined stream is then passed through a static mixer with at least two sections which manipulate the doughs by dividing, folding, and merging the divided stream to pass through a die insert to give a product having at least one distinct phase such as a multi-colored, variegated appearance. Finally, the stream passes through the shaping die yielding the product configuration. The product passing through the die may be directly expanded. Alternatively, the material is formed into a pellet which is puffed or flaked. The product is then dried to a pre-determined moisture content.

The apparatus of the invention includes a static mixing zone which is formed of a single mixing element. The static mixing element has at least two sections. The first or front section has a forward tapered edge which divides the combined stream and folds each of the divided streams in opposite transverse directions through an angle in the range of about 45° to 225° and, in the second section, divides and folds in opposite but reversed directions from the of that prior or first section over an angle in the range of about 90° to 180° and preferably 110° to 135°. The static mixing element also includes a scalloped area at the exit end of the rear-most section of the static mixer to allow the divided flows to heal together or recombine before the flow enters a shaping die. The static mixer of the invention produces minimal mixing, allows a smooth separation of flows going toward the die insert and allows the flows to mix and heal back together as they flow into the die.

The various features which characterize the invention are pointed out with particularity in the claims annexed to and forming a part of this specification. For a better understanding of the invention, its operating advantages, and specific objects obtained by its use, reference should be made to the accompanying drawings and descriptive matter in which there is illustrated and described a preferred embodiment of the invention.

BRIEF DESCRIPTION OF THE DRAWINGS

FIG. 1 shows schematically the process of the invention;

FIG. 2 shows a static mixer of the invention;

FIG. 3 shows an end view of the static mixer of FIG. 2 along view line A—A; and

FIG. 4 shows an end view of the static mixer of FIG. 2 along view line B—B.

DESCRIPTION OF PREFERRED EMBODIMENT

The present invention is in a process and apparatus for producing a food product, such as a cereal, snack, or convenience food, having at least one distinct phase such as color, flavor, or texture and, especially, for producing a ready-to-eat ("R-T-E") cereal product having at least one varied characteristic.

FIG. 1 schematically depicts a preferred embodiment of the process of the invention for producing a product of the invention such as R-T-E cereal product which may be rice, wheat, psyllium, oat, barley, sorghum, corn, brans, or any mixture of cereal grains or ingredients and may be in any form such as flakes, shreds, biscuits, loops, nuggets, puffs, or any other suitable form.

Referring to FIG. 1, a cereal dough 12 of the desired cereal ingredients is prepared according to methods known to those in the art. The dough preparation step is referred to as 10 in the Figure. The dough preferably has a moisture content of from about 15 to 35 wt.-%. Depending on how many distinct phases or variable characteristics the product is to have, an agent, such as a coloring and/or flavoring agent can be added to the dough mix in the dough preparation step by a simple blending a mixing operation. Optionally, two separate dough mixes can be prepared each including a varied characteristic.

Dough 12 is then introduced to an extrusion system 14. While the process of the invention can be carried out in a single screw extruder, the extrusion system preferably includes a twin screw extruder of the type commonly available from, for instance, Werner-Pfleiderer Co.

In the extrusion system 14, the dough is blended and cooked. The blending can be controlled by varying the mixing intensity within the extrusion chamber. The mixing intensity can give rise to shearing stresses causing rheological changes in the dough. Simultaneously, the dough is cooked at a temperature in the range of 70° to 250° F. for a period of 1 to 2 minutes to provide a fully, or at least substantially fully, cooked mass. During the extrusion, there may be an evaporation of moisture. However, the conditions within the extrusion chamber cause a significant pressure increase within the chamber so that the mixed and cooked dough may be at a pressure in excess of 700 to 800, and more commonly 1000 to 2000 psig, at the extruder chamber outlet. The temperature of the cooked mass is in the range of 75° to 250° F. Thus, when the extruders are not equipped with in-zone venting, the cooked mass need not experience any large changes in moisture content. When the extrusion system is formed of two or more separate chambers, one or more of the chambers may optionally be vented and the cooked product consistency or porosity may be manipulated as desired in this manner.

If the product is to be direct expanded, higher food temperatures and pressures are required. Suitable equipment, if available, may enable higher pressures.

In a preferred embodiment, the extruded dough, if processed in a single extrusion chamber with a single screw, is split into at least two separate streams. When the dough has been cooked in a multi-chamber extruder or cooking apparatus, the extruded doughs are already in a plurality of streams. The divided or separate streams 16a and 16b are then introduced into a mixing system, i.e., where each stream is separately mixed.

In a preferred embodiment, mixing system 18 is one which contains a mixing section for each dough stream. The dough streams are subject to a mixing action in the mixers for a period of about less than about 30 seconds. A complete mixing is not essential but the mixing should be sufficient so that a distinct phase is obtained when, for instance, a coloring agent is added. Typical mixing periods are of the order of about 5 to 10 seconds. In a preferred embodiment, the mixers are Maddock type mixers available from Union Carbide of Danbury, Conn. The Maddock mixer, in addition to intermixing the coloring and/or flavoring and/or texturizing agents into the cooked mass, further shears the mass which may be beneficial for further processing such as pelletizing. The mixers are preferably operated at speeds of 20 to 80 rpm and typically at the temperatures of the cooked dough.

Mixing section 18 has at least two mixing chambers and each stream 16a and 16b from the extruder system is introduced into the respective mixing chamber. A coloring and/or flavoring or texturizing agent 20 is introduced just before, at, or near the entry sections of the mixing chambers. The texturizing agents can include emulsifiers, particulate, blowing agents such as $CO_2$, corn syrup, oils, etc. Different colorings, flavorings, and texturizing agents are optionally added to each of the dough streams or mixing chambers so that each of the dough streams now differs in at least one characteristic from the other of the one or more dough streams. Of course, one need not vary both streams.

The mixed streams leave the mixing system 18 and preferably remain separated in conduits and are led through channels to a re-mix section 24. In the re-mix sections, the separated streams are brought together to form a single stream. The two or more streams may be combined such that each of the streams is laterally adjacent to at least one other stream. However, in a preferred embodiment, the re-mix section is formed so that one of the streams is, for a short period of time, flowing in an annular cavity while the other stream is flowing in a pipe or tube concentric to the annular cavity. The annular cavity and concentric tube feed into a chamber wherein the respective streams are combined.

Following the re-mix, the dough 26 is then introduced into, and passed through a closing adjacent static mixer zone 28, which will be described below. The composition 30 leaves the static mixer 28 and is passed through a die insert 32 and is then passed 34 to one or more further processing steps (generally and collectively 36), which may include pelletizing, puffing, or flaking or other processing to form the final product configuration. Alternatively, the product can be direct expanded as it exits die 32.

Referring to FIGS. 2 to 4, a static mixer used in the static mixing zone 28 is shown. The mixer is preferably a single piece construction having a forward or first section 150 and a rear or second section 152. In a preferred embodiment, the first section 150 is adjacent to the exit section of the re-mix area and is preferably less than about ¼" and most preferably about 1/16 to 3/16" linearly displaced from the re-mix exit.

Each of sections 150 and 152 is contoured in a helical configuration. In the process of the invention, the re-mixed flow would first contact forward section 150 and then rear section 152. Forward section 150 smoothly separates the flow and the rear section 152, inter alia, allows the flows to mix and heal back together. In a preferred embodiment, the static mixer is formed of the first and second section only but it may include additional, intermediate sections. In such an embodiment, the third, fifth etc. sections would be similar to the first section 150 while the fourth, sixth, etc. sections could optionally be similar to the rear section but for the scalloped boundary described below. However, the static mixer could be constructed with, e.g., 3, 5, or 7 sections where each of the sections, except for the rear-most, is similar to the first section 150 but optionally offset and/or with a different angle of rotation.

The forward section 150 and rear section 152 both merge at a common area 154. The forward section 150 is formed with a front edge 156 having a bevelled surface 158. The forward section is also defined by edges 160 and 162, each of which is at least an arcuate portion of a helix. The forward section 150 is thus formed to have a first surface 164 which has two upward sloping areas 166 and 168 and two downward sloping areas 170 and 172.

In the process of the invention, the combined stream from re-mix section 24 is passed through the static mixing zone wherein it feeds into the first or forward section 150. The mass is divided at the front edge 156 and due to the bevelled surface, is partially directed along the respective surfaces. While the divided streams are travelling in the direction of the longitudinal axes of the mixer, each stream folds in oppositely transverse directions over an angle in the range of 45° to 225°, preferably an angle of 90° to 180° and most preferably over an angle of 110° to 135°. Since the stream is only divided and folded in the front section, the amount of fold is optional and approximated within the above-described angular ranges.

The rear section 152, most clearly illustrated in FIGS. 3 and 4, is partially defined by edges 174 and 176, both of which follow a helix pattern. The rear section is formed with a cut-away or scalloped section 178, preferably in the form of a notch. The cut-away 178 is partially bound by a surface 180 which has the appearance of a twisted "S" in mirror image with the extremities (182, 184) distorted as if to extend substantially perpendicular to the plane of FIG. 4. The extremities 182 and 184 are optionally angularly offset from the vertical plane V and/or from the horizontal plane H, shown in FIG. 4.

In the invention, the divided and folded flows of the first or forward section 150 flow into the rear section 152 where the flows, while still moving in the direction of the longitudinal axis of the static mixing zone from the re-mix chamber 24 to the die 32, are again folded transversely but in a reversed direction from the prior section. The angle of folding in the rear-most section 152 is of importance since it is the last manipulation of the stream prior to the shaping die or the other processing. The angle in the rear section is about 90° to 180° and preferably 110° to 135°. In a preferred embodiment, the dough from the first section 150 of the static mixer 28 is divided in the second section 152 and folded through the angle.

The divided streams, having been folded, are recombined near an exit end of the rear section 152 in an area including the scallop section 178 just prior to the exit. The exit end of the rear section 152 is closely adjacent to the shaping die 32.

The shaping die may be of any desired configuration to give the requisite shape to the recombined mass. In one embodiment, the shaping die produces a mass having a curvilinear shape which optionally can be contoured in three dimensions.

EXAMPLES

In each of the following Examples 1 to 5, the same procedure was followed and the same equipment used.

A hydrated flour mix was formed. The flour mix varied as indicated below. The flour was hydrated to the specified moisture content and contained optional additives such as sugar, salt, and partially hydrogenated vegetable oil in customary amounts for cereals. The hydrated flour mix was formed in a pre-mixing step and was at a temperature as specified below.

The hydrated flour mix was then introduced into a single chamber co-rotating twin screw extruder which operated over a temperature range of about 140° to 250° F. as set forth in the Table below. The flour mix was cooked, without venting, for a period of 1 to 2 minutes in the extruder.

The cooked material developed a pressure within the extruder chamber, multi-zone, which was measured at, or near, the chamber outlet and is tabulated below. The cooked mass from the extruder chamber was separated into two separate flow stream and each stream was introduced into a separate mixing chamber of a Maddock mixer. In the Table, the temperature of the cooked mass as it is introduced into the mixing chambers is designated as "Food Temp.". At the beginning of each of the mixing chambers, coloring and/or flavoring was injected. In the Table below, an indication such as R/B means that red coloring was injected in one mixer and blue coloring in the other mixing chamber. Also coloring may be injected in one chamber and flavoring alone or with coloring may be injected in the other.

Following the mixing period, the separate streams are led to the re-mix insert, forced through the static mixer and the die. At the exit from the die, the product experiences some degree of flashing thus reducing the product moisture content. The product is then cooled and dried to a moisture content of 10 to 12 wt.-% as tabulated below and subjected to final processing, e.g., puffing or flaking. The puffed or flaked product is brought to a final moisture content of about 3%.

TABLE

|  | 1 | 2 | 3 | 4 | 5 |
|---|---|---|---|---|---|
| Flour | Wheat/Corn | Wheat/Corn/Rice | Corn | Corn/Wheat/Rice | Wheat |
| Moisture (wt.-%) | 34 | 34 | 34 | 34 | 42 |
| Pre-mix Temp (°F.) | 180 | 175 | 180 | Amb. | Amb. |
| Zone 1 Temp (°F.) | 143 | 156 | 153 | 150 | 150 |
| Zone 2 Temp (°F.) | 249 | 254 | 249 | 246 | 249 |
| Food Temp (°F.) | 238 | 242 | 232 | 230 | 228 |
| Pressure (psig) | 1650 | 1300 | 1600 | 740 | 1190 |
| Coloring* | R | R/B | O/Y | Bn | Bn |
| Flavoring* | None | None | None | CMV | Vanilla |

TABLE-continued

|  | 1 | 2 | 3 | 4 | 5 |
| --- | --- | --- | --- | --- | --- |
| H₂O wt.-% (Dried) | 10–12 | 10–12 | 10–12 | 10–12 | 10–12 |
| Processing | Puffed | Puffed | Puffed | Puffed | Puffed |

*R = Red, B = Blue, O = Orange, Y = Yellow, Bn = Brown, V = Vanilla, CVM = Chocolate Vanilla Marshmallow The terms and expressions which have been employed are used as terms of description and not of limitation, and there is no intention in the use of such terms and expressions of excluding any equivalents of the features shown and described or portions thereof; it being recognized that various modifications are possible within the scope of the invention.

We claim:

1. A process for producing a food product having at least one of a distinct colored, textured or flavored phase comprising:
   providing at least two cooked food streams;
   providing at least one of said cooked streams with at least one of a coloring, texturizing and a flavoring agent;
   combining the cooked streams into a single stream;
   passing said single stream through a static mixing zone having a static mixing element therein, said static mixing element having a forward section and a rear section, said rear section comprising extremities and a cut-away section which define the exit end of said rear section, wherein said stream is divided by said forward section into separate streams which follow opposite helical paths and divided again in said rear section wherein the separate streams follow helical paths opposite to those of said forward section and are at least partially recombined in said cut-away section prior to passing beyond said extremities to form a food stream containing at least one distinct phase of said coloring, texturizing or flavoring agent; and
   passing said stream through a die to form said product.

2. The process of claim 1 wherein the shaping die is closely adjacent the exit end of the static mixing zone.

3. The process of claim 1 wherein the static mixing zone consists only of two sections.

4. The process of claim 1 wherein the texturizing agent is at least one of an emulsifying or blowing agent.

5. The process of claim 1 wherein the cooked streams are concentrically combined into a single stream.

6. The process of claim 1 wherein the helical paths in said second section of the static mixing zone rotate through an angle of 90° to 180°.

7. The process of claim 6 wherein the angle is 110° to 135°.

8. The process of claim 1 wherein the at least two food streams are the same and are cooked in an extruder.

9. The process of claim 8 wherein the at least two cooked food streams have a moisture content of 15 to 35 wt.-%.

10. The process of claim 8 wherein the extruder in a twin screw extruder.

11. The process of claim 10 wherein the twin screw extruder has at least one outlet and the pressure of the cooked material at the outlet is 700 to 2000 psig.

12. The process of claim 11 wherein each of the least two cooked streams are introduced into a separate mixing chamber and at least one of the streams is provided with at least one of a coloring, texturizing, and flavoring agent.

13. The process of claim 12 wherein at least one of a coloring, flavoring, and texturizing agent is injected into at least one of the cooked streams just before, at, or at the beginning of the respective chamber.

14. The process of claim 12 wherein at least one of coloring, flavoring, and texturizing agent are introduced into each of the chambers.

15. The process of claim 1 further comprising forming the single stream into a pellet after passing through said die.

16. The process of claim 15 wherein the pellet is puffed or flaked.

17. The process of claim 16 further comprising drying the puffed or flaked pellet to a pre-determined moisture content.

18. The process of claim 17 wherein the pre-determined moisture content is from about 1 to about 5%.

19. In a process for extruding a food product wherein at least two food streams are provided, further wherein at least one of the food streams is provided with one or more of a coloring, texturizing or flavoring agent and concentrically combined with another of the food streams into a single stream which is forced through a shaping die, the improvement comprising:
   passing the single stream through a static mixing zone having a static mixing element therein, said static mixing element having a forward section and a rear section, said rear section comprising extremities and a cut-away section which define the exit end of the rear section, wherein said stream is divided by said forward section into separate streams which follow opposite helical paths and are divided again by said rear section wherein the separate streams follow helical paths opposite to those of the forward section and are at least partially recombined in said cut-away section prior to passing beyond said extremities without homogeneous mixing to form a food stream containing at least one distinct phase of said coloring, texturizing or flavoring agent; and passing said food stream through a die to form a product having one or more distinct phases different from any other phase on the basis of any one of color, flavor or texture.

20. The process of claim 19 wherein the two food streams are separately provided with different coloring agents.

21. The process of claim 19 wherein the two food streams are separately provided with a coloring agent and a flavoring agent.

22. The process of claim 19 wherein the two food streams are separately provided with a coloring agent and a texturizing agent.

23. The process of claim 19 wherein the two food streams are separately provided with different texturizing agents.

24. The process of claim 19 wherein the two food streams are separately provided with different flavoring agents.

* * * * *